W. J. ROLLE.
HOSE COUPLING.
APPLICATION FILED SEPT. 27, 1910.
991,374.
Patented May 2, 1911.
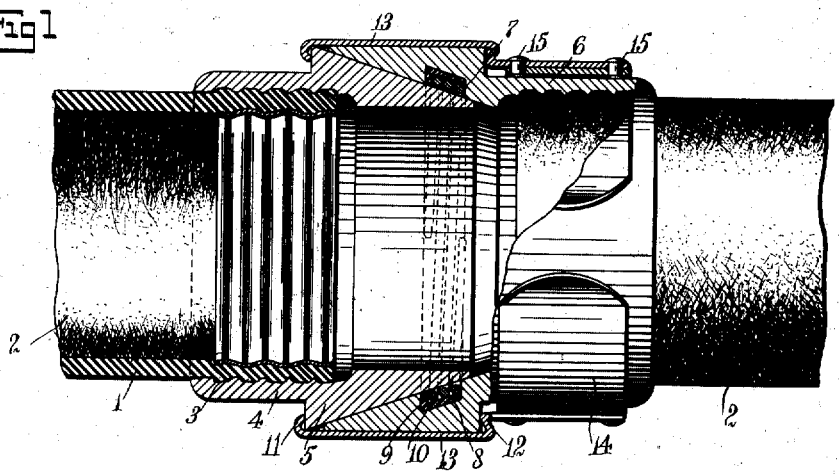
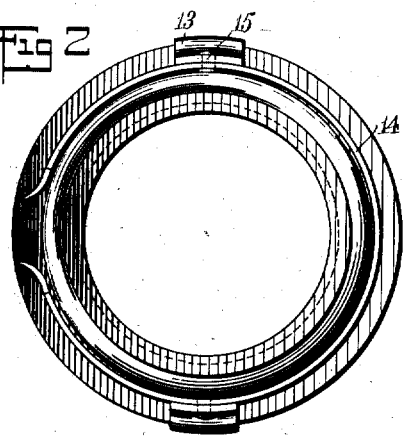 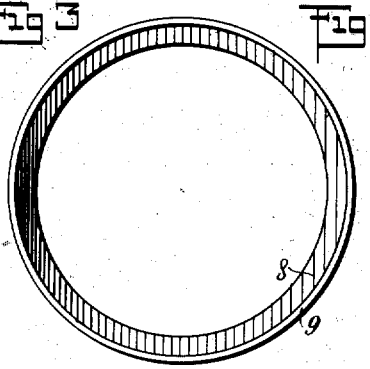 
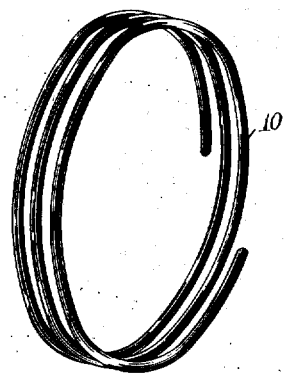
WITNESSES:
INVENTOR
William J. Rolle
BY
ATTORNEYS

UNITED STATES PATENT OFFICE.

WILLIAM JOSEPH ROLLE, OF OILFIELDS, CALIFORNIA.

HOSE-COUPLING.

991,374. Specification of Letters Patent. Patented May 2, 1911.

Application filed September 27, 1910. Serial No. 584,079.

*To all whom it may concern:*

Be it known that I, WILLIAM J. ROLLE, a citizen of the United States, and a resident of Oilfields, in the county of Fresno and State of California, have invented a new and Improved Hose-Coupling, of which the following is a full, clear, and exact description.

This invention relates to a new and improved hose coupling of a type adapted to connect together two sections of any hose.

An object of the invention is to provide a device which will be simple in construction, inexpensive to manufacture, strong, durable, and attachable and detachable in the shortest possible space of time.

A further object of this invention is to provide a hose coupling comprising a pair of interfitting members having an efficient automatic packing disposed therebetween.

These and further objects together with the construction and combination of parts will be more particularly described hereinafter and set forth in the appended claims.

Reference may be had to the accompanying drawings in which like reference characters denote corresponding parts in the several views, and in which—

Figure 1 is a side view and elevation partly in section showing the underlying construction; Fig. 2 is an end view looking from right to left in Fig. 1; Fig. 3 is a front view of the packing ring; Fig. 4 is a vertical section through the packing ring; and Fig. 5 is a perspective view of the spiral spring.

Referring more particularly to the separate parts of the device, 1 indicates a hose section which is to be attached to a similar hose section indicated at 2. Secured to the hose section 1 in any suitable manner, as by being provided with a corrugated interior indicated at 3, there is provided a coupling member 4 which is formed at its engaging end with an enlargement 5 which is preferably conical in shape, and having a taper converging toward the open end of the member. Secured in a similar manner to the hose section 2, there is provided a coöperating coupling member 6, which has a tapered conical socket to fit the conical extremity of the coupling member 4. In order that there may be a perfectly fluid tight joint between the coupling members 4 and 6, one of them, preferably the member 6, is provided with a circular recess 7 in which is located a packing ring 8, having a tapered inwardly extending flange 9, which is adapted to engage the conical surface of the coupling member 4. Also within this recess 7 there is provided a spiral spring 10 which is adapted to urge the flange 9 into tight and yet yielding engagement with the coupling member 4 so as to prevent the leakage of fluid and yet permit the relative adjustment of the members 4 and 6.

In order to lock the coupling members 4 and 6 together, the member 6 is also enlarged to form a cylindrical projection or lug similar to that formed by the enlargement 5 which is engaged by the inwardly curved ends 11 and 12 of spring clamps 13. Any suitable number of these spring clamps may be provided, and they may be secured to one of the coupling members in any suitable manner, as by means of a spring clip 14, which in this case is shown as engaging the coupling member 6. The manner of securing the spring clamps 13 to the spring clip 14, which in this case is shown in the form of a broken ring having its ends tapered to permit a more ready attachment thereof, may be of any suitable character such as by means of rivets 15. It will thus be seen that it is simply necessary to force the coupling member 6 on to the coupling member 4, when the curved ends 11 of the spring clamps 13 will automatically snap over the enlargement 5, thereby securing the coupling members together. Inasmuch as the spring 10 forces the ring 8 in engagement with the coupling member 6, and the flange 9 thereof in engagement with the coupling member 4, a perfectly fluid tight joint will be made.

While I have shown one embodiment of my invention I do not wish to be limited to the specific details thereof, but desire to be protected in various changes and alterations which may come within the scope of the appended claims.

Having thus described my invention, I claim as new and desire to secure by Letters Patent:—

1. The combination with a pair of coupling members having coöperating conical surfaces, of means for securing said coupling members together, and a packing ring adapted to form a fluid tight joint between said coupling members, comprising a body portion and a flange, and a spring adapted to urge said body portion into engagement with one of said coupling members and said flange into engagement with both of said coupling members.

2. The combination with a pair of coupling members having conical coöperating surfaces, of packing interposed between said surfaces, and means for securing said coupling members together, comprising a plurality of spring clamps each bent at one end and intermediate its ends to form engaging portions adapted to engage enlargements on said coupling members, and a spring clip for engaging one of said coupling members and removably securing said spring clamps to one of said coupling members.

3. The combination with a coupling member having a conical socket therein and also having an annular cavity facing on said socket, of a packing ring in said cavity having a radially-extending flange projecting inwardly beyond the conical surface of said socket, another coupling member having a conical taper adapted to be inserted in said socket and through the opening inclosed by said flange and in contact with said flange, a spring adapted to hold said flange in tight relation with both of said coupling members, and means for securing said coupling members together.

In testimony whereof I have signed my name to this specification in the presence of two subscribing witnesses.

WILLIAM JOSEPH ROLLE.

Witnesses:
D. HEGGIE,
R. S. FINE.